United States Patent
Weiler et al.

(10) Patent No.: US 12,134,233 B2
(45) Date of Patent: Nov. 5, 2024

(54) APPARATUS AND METHOD FOR PRODUCING A GATHERED OR GATHERABLE MATERIAL

(71) Applicant: Herrmann Ultraschalltechnick GmbH & Co. KG, Karlsbad (DE)

(72) Inventors: Dave Weiler, Geneva, IL (US); Markus Pasternak, Karlsbad (DE); Raquel Roussel Garcia, Karlsruhe (DE); Timo Zink, Karlsruhe (DE)

(73) Assignee: HERRMANN ULTRASCHALLTECHNIK GMBH & CO. KG, Karlsbad (DE)

( * ) Notice: Subject to any disclaimer, the term of this patent is extended or adjusted under 35 U.S.C. 154(b) by 381 days.

(21) Appl. No.: 17/630,233

(22) PCT Filed: Sep. 3, 2020

(86) PCT No.: PCT/EP2020/074682
§ 371 (c)(1),
(2) Date: Jan. 26, 2022

(87) PCT Pub. No.: WO2021/043943
PCT Pub. Date: Mar. 11, 2021

(65) Prior Publication Data
US 2022/0250331 A1  Aug. 11, 2022

(30) Foreign Application Priority Data
Sep. 6, 2019 (DE) .................. 10 2019 124 006.9

(51) Int. Cl.
*B29C 65/08* (2006.01)
*B29L 7/00* (2006.01)
*B29L 9/00* (2006.01)

(52) U.S. Cl.
CPC .... *B29C 65/086* (2013.01); *B29K 2995/0046* (2013.01); *B29L 2007/007* (2013.01); *B29L 2009/008* (2013.01)

(58) Field of Classification Search
CPC ............ B29C 65/086; B29K 2995/046; B32B 37/04; B32B 37/144; B32B 2310/028
(Continued)

(56) References Cited

U.S. PATENT DOCUMENTS

| | | | |
|---|---|---|---|
| 5,713,399 A | 2/1998 | Collette et al. | |
| 6,291,039 B1 | 9/2001 | Combe et al. | |
| 10,259,165 B2 | 4/2019 | Ehlert et al. | |
| 2015/0352662 A1* | 12/2015 | Sheehan | .................. B06B 3/00 228/1.1 |

(Continued)

FOREIGN PATENT DOCUMENTS

| DE | 10351831 A1 | 6/2005 |
|---|---|---|
| EP | 0375707 B1 | 7/1990 |

(Continued)

OTHER PUBLICATIONS

Agnes Wittmann-Regis, The International Bureau of the World Intellectual Property Organization, International Preliminary Report on Patentability, Report Issued: Mar. 8, 2022, PCT/EP2020/074682 (English translation).

(Continued)

*Primary Examiner* — James D Sells
(74) *Attorney, Agent, or Firm* — PAUL & PAUL

(57) ABSTRACT

The present invention relates to an apparatus for producing a gathered material, wherein the material consists of two material web portions and a thread positioned between the material web portions and the two material web portions are connected to one another at two connecting surfaces, wherein the thread is disposed between the two connecting surfaces such that the thread is connected to the material web (Continued)

Figure 1:
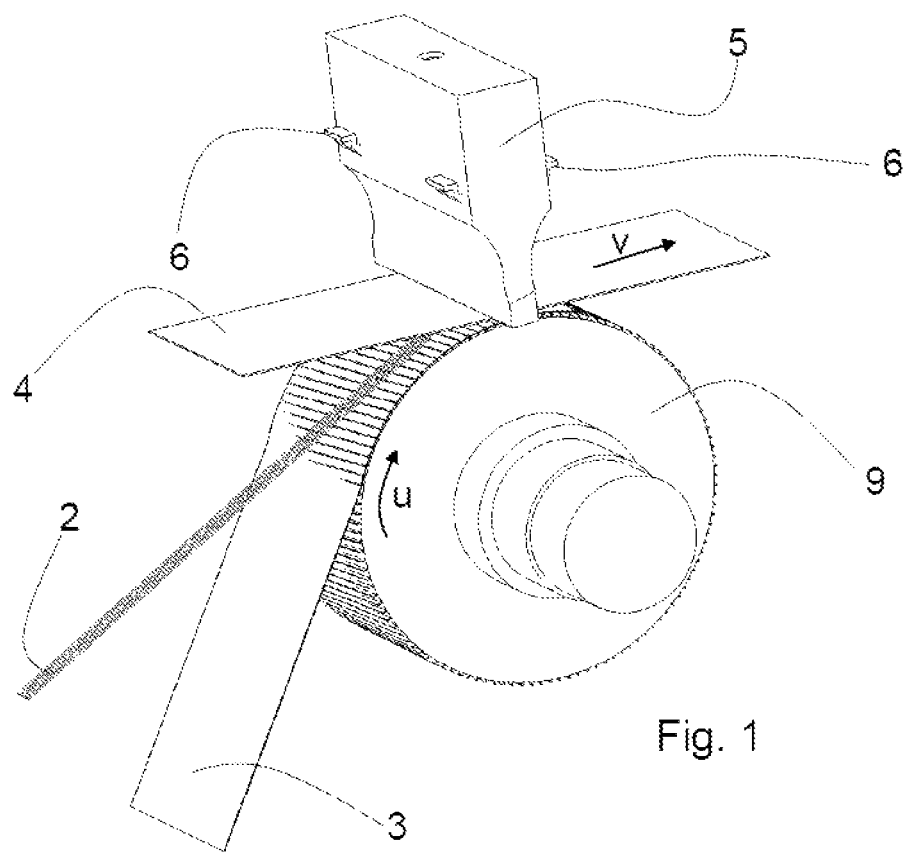

portions, wherein the apparatus comprises a sonotrode having a first sealing surface and a counter tool having a second sealing surface, wherein the counter tool is cylindrical with a lateral surface and a cylinder axis and the second sealing surface is disposed on the lateral surface, wherein the sonotrode and the counter tool are disposed with respect to one another in a processing position such that the material web portions and the thread can be guided through a gap formed by the first and the second sealing surface in a feed direction tangential to the lateral surface of the counter tool. To overcome or at least mitigate the described drawbacks, it is proposed according to the invention that the sonotrode comprise a groove which is oriented in feed direction and extends over the entire first sealing surface for receiving the thread.

20 Claims, 11 Drawing Sheets

(58) Field of Classification Search
USPC .......................................... 156/73.1
See application file for complete search history.

(56) References Cited

U.S. PATENT DOCUMENTS

| 2018/0093444 A1 | 4/2018 | Begrow et al. |
| 2019/0070041 A1 | 3/2019 | Schneider et al. |

FOREIGN PATENT DOCUMENTS

| EP | 0457187 A2 | 11/1991 |
| EP | 1529623 A2 | 5/2005 |
| JP | 1993131174 A | 5/1993 |
| JP | 2001504899 A | 4/2001 |
| JP | 2008104853 A | 5/2008 |
| WO | 2018118518 A1 | 6/2018 |

OTHER PUBLICATIONS

Patent Office Examiner Atori Koichi, Japanese Patent Application No. 2022-514549, Mailing Date of Office Action: May 9, 2023 (English Translation).

* cited by examiner

APPARATUS AND METHOD FOR PRODUCING A GATHERED OR GATHERABLE MATERIAL

CROSS-REFERENCE TO RELATED APPLICATIONS

This application is a national phase of International Application PCT/EP2020/074682 filed Sep. 3, 2020, and claims the priority of German Application No. 10 2019 124 006.9, filed on Sep. 6, 2019.

The present invention relates to an apparatus and a method for producing a gathered or gatherable material. The gathered or gatherable material consists of at least two material web portions and at least one thread positioned between the material web portions. The two material web portions are connected to one another at at least two connecting surfaces and the thread is disposed between the material web portions and between the two connecting surfaces as a result of which the thread is secured between the material web portions such that there is a form-locking connection between the thread and the material web portions in a first and a second direction which is oriented perpendicular to the first direction.

Relative movability between the thread and the material web portions may be provided in a third direction oriented perpendicular to the first and the second direction.

The two material web portions can be realised by two material webs which are connected via the connecting surfaces. It is also possible to fold a material web in such a way that a first material web portion of this material web comes to rest opposite a second material web portion and the thread is disposed between the first and the second material web portion.

The apparatus further comprises a sonotrode having a first sealing surface and a counter tool having a second sealing surface. The sonotrode is designed to be excited with an ultrasonic vibration such that contact between the first sealing surface vibrating with the ultrasonic vibration and the material webs results in a welding process and the connecting surfaces are formed by welding the material web portions together.

The counter tool is cylindrical with a lateral surface and a first cylinder axis. The second sealing surface is disposed on the lateral surface and the counter tool can be rotated about the cylinder axis, wherein the sonotrode and the counter-tool are disposed with respect to one another in a processing position such that the material web portions and the thread can be guided through a gap formed by the first and the second sealing surface in a feed direction tangential to the lateral surface of the counter tool. The movement of the material web portions typically takes place at a speed that corresponds to the rotational speed of the lateral surface of the counter tool. The at least one thread disposed between the material web portions is frequently placed under tensile stress during the creation of the connecting surfaces such that its outer circumference is reduced and its length is increased. Once the tensile stress is released after the creation of the connecting surfaces, the outer circumference expands again.

Such a tool is known from U.S. Pat. No. 10,259,165 B2, for example.

In this case, a complexly structured roller is used as a counter tool. On the lateral surface of this counter tool there are ribs, the surfaces of which in turn comprise notches that are disposed transverse to the orientation of said ribs. With this tool, threading the threads into the apparatus involves a considerable amount of effort. The production of the engraved counter tool is also very complex. When the thread is replaced with a thread of a different material or replaced with a thread of the same material but a different thickness, when the combination of materials used for the material web and the thread is changed, and when the tension under which a thread is held in the tool during processing is changed, the complexly engraved counter tool roller has to be replaced.

Based on the described state of the art, it is therefore the object of the present invention to overcome or at least mitigate the described disadvantages.

According to the invention, this object is achieved in that the sonotrode comprises at least one groove which is oriented in feed direction and preferably extends over the entire first sealing surface for at least partially receiving the at least one thread. In order to allow the thread to move in a direction relative to the material web portions, it is necessary that the thread not be welded to said material web portions. The thread is therefore guided inside the groove while the sealing surface portions which delimit the groove create the connecting surfaces in that the material web portions are guided between the first and the second sealing surface and processed. The material web portions are likewise positioned partially in the groove.

Even though an advantage is already achieved if the thread is only partially received in the groove, it is preferred if the thread is received completely in the groove during ultrasonic processing.

In a further preferred embodiment, it is provided that the sonotrode comprise a plurality of grooves which are oriented in feed direction for at least partially receiving the at least one thread, wherein the grooves are preferably spaced between 0.1 and 100 mm and particularly preferably between 0.5 and 2.5 mm apart from one another. In preferred embodiments, more than 15 or even more than 50 grooves are provided.

The use of very thin threads is possible as well. If the intent is for the sonotrode to also be suitable for producing gathered material with very thin threads, the spacing between the grooves can be selected to be even smaller. The spacing can be less than 0.2 mm, for example, and most preferably between 0.01 mm and 0.15 mm.

It has been shown that a gatherable material is easier to gather when multiple threads are connected to the material web portions in the manner described. Therefore, the sonotrode comprises a plurality of grooves, wherein each groove is provided to receive at least one thread during processing. The threads should not be spaced too far apart. It is also possible to provide significantly more grooves than threads being processed.

In a further preferred embodiment it is provided that the at least one groove have a depth between 0.02 and 1 mm. The depth of the groove must be dimensioned such that the thread used can engage at least partially in the groove. It may be necessary to apply tensile stress to the thread during processing in order to reduce the thread diameter. It has been shown that, in some cases, the mentioned groove depths achieve the best results.

In a further preferred embodiment it is provided that the at least one groove have a width between 0.02 and 1 mm.

In a further preferred embodiment, the spacing between adjacent grooves is less than the width of the grooves.

It is further advantageous if the at least one groove has a semicircular cross-section, a U-shaped cross-section or a V-shaped cross-section.

In the case of a U-shaped cross-section, it is advantageous if the flanks of the groove are inclined outward. A flank angle between 0° and 30° or better between 0° and 20° is particularly preferred.

In a further preferred embodiment, it is provided that the first sealing surface be substantially flat. For example, a stationary sonotrode can be used, which is moved away from the second sealing surface for threading the material web portions and the threads if necessary.

However, it is also possible for the first sealing surface to comprise a weld section that is substantially flat and an inlet section disposed adjacent to the weld section, wherein the inlet section is convexly curved, wherein the radius of curvature of the convexly curved inlet section is preferably greater than 1 mm, particularly preferably greater than 5 mm and most preferably between 6 mm and 15 mm. The groove can be disposed in both the weld section and the inlet section. In this case, the at least one thread should be fed in such a way that it rests against both the inlet section and the weld section. This allows the at least one thread to be held securely in the groove without the risk of the thread leaving the groove during processing.

The sonotrode can alternatively also be cylindrical with a lateral surface and a second cylinder axis, wherein the first sealing surface is disposed on the lateral surface and is rotatable about the second cylinder axis, wherein the at least one groove preferably runs around the lateral surface of the sonotrode in a circular manner.

In other words, in this embodiment, the sonotrode and the counter tool are both roller-shaped and roll on one another, wherein the material web portions and the at least one thread are guided between the two lateral surfaces.

In a further preferred embodiment, it is provided that the counter tool comprise at least one rib, which has at least one portion that is not oriented in circumferential direction.

The ribs serve to create the connecting portions. The rib produces a weld seam that is interrupted where the groove is situated on the sonotrode, because no welding force is transmitted from the sonotrode to the material web portions at this location.

The rib can be zigzag-shaped or wave-shaped, for example.

The at least one rib can also be linear, whereby the rib does not have to be oriented parallel to the first cylinder axis.

The special shapes of the ribs produce a better distribution of forces.

In a further preferred embodiment, it is provided that the second sealing surface not comprise a groove for partially receiving the at least one thread to ensure that the thread is completely received in the groove of the first sealing surface.

In an alternative embodiment, it is provided that the second sealing surface comprise at least one groove which is oriented in feed direction and preferably completely surrounds the lateral surface of the second tool for partially receiving the at least one thread, wherein, in the processing position, the at least one groove in the first sealing surface is disposed opposite to the at least one groove in the second sealing surface such that the at least one thread can be received simultaneously both in the at least one groove in the first sealing surface and in the at least one groove in the second sealing surface.

These measures also allow material web portions to be connected to threads having larger diameters.

In a particularly preferred embodiment, the sonotrode comprises at least partly comprises a coating and the at least one groove is disposed in the coating. The coating can consist of hard metal, for example, and particularly preferably of tungsten carbide. Because the groove is disposed in the coating, it is possible to replace only the coating when the abrasion on the sonotrode caused by the at least one thread has exceeded an acceptable level, while the sonotrode itself can be used further. The same is true also if the arrangement and the geometry of the grooves has to be changed for any reason. The at least one groove can be introduced into the coating by eroding or grinding, for example.

The present invention also relates to a method for producing a gathered or gatherable material, wherein the material consists of two material web portions and at least one thread, wherein the material web portions are connected to one another at at least two connecting surfaces and the thread is positioned between the material web portions and between the connecting surfaces such that there is a form-locking connection between the thread and the material web portions in a first and a second direction, wherein the first and the second direction are oriented perpendicular to one another.

According to the invention, it is now provided that an apparatus of the abovementioned type be used and the two material web portions together with the at least one thread be guided through the gap in feed direction while the sonotrode is set in ultrasonic vibration, whereby the thread is guided through the at least one groove.

It is possible to use an elastic thread. The at least one elastic thread is then placed under tensile stress during processing. Thus, the diameter of the unloaded elastic thread can be greater than the diameter of the groove. Placing the elastic thread under tensile stress reduces the diameter of the elastic thread to such an extent that the thread fits inside the provided grooves. After processing, the tensile stress can be released again so that the diameter of the thread increases again, as a result of which the thread is clamped between the material web portions. Although it is still possible to move the material web portions relative to the thread, it is necessary to overcome a corresponding frictional force and possibly place the thread under tensile stress, so that there is hardly any relative movement between the thread and the material web during normal use of the material.

It is also possible to use a sonotrode comprising a number of grooves greater than the number of threads positioned between the material web portions and between the connecting surfaces. There is then also no clear predetermination which groove which thread is received in. Instead, each thread will place itself in a groove that is closest to its position.

Further advantages, options and possible applications will become apparent from the following description of preferred embodiments and the associated figures.

Figure 2:
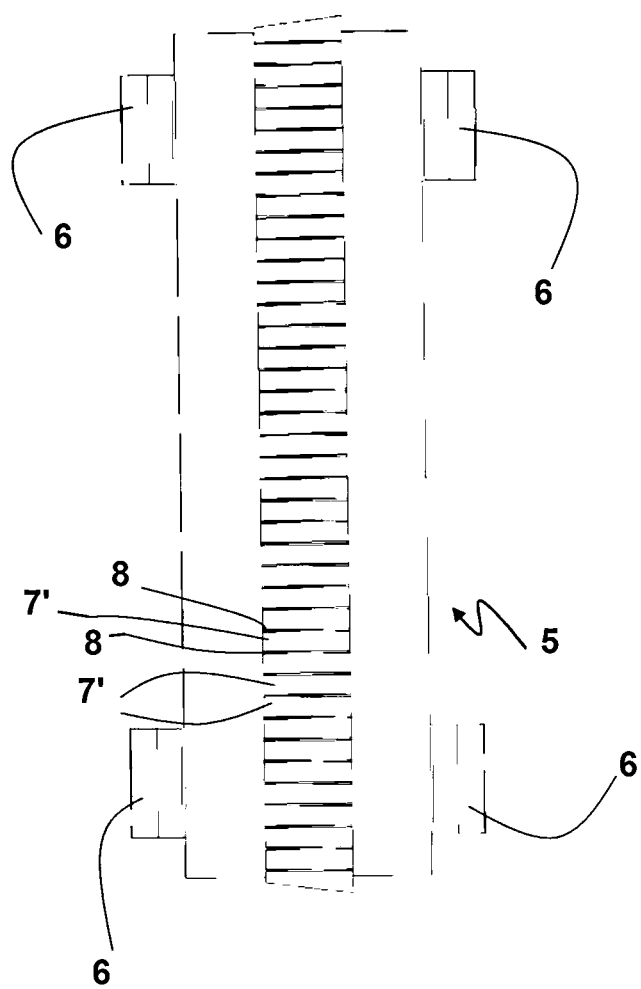
Figure 3:
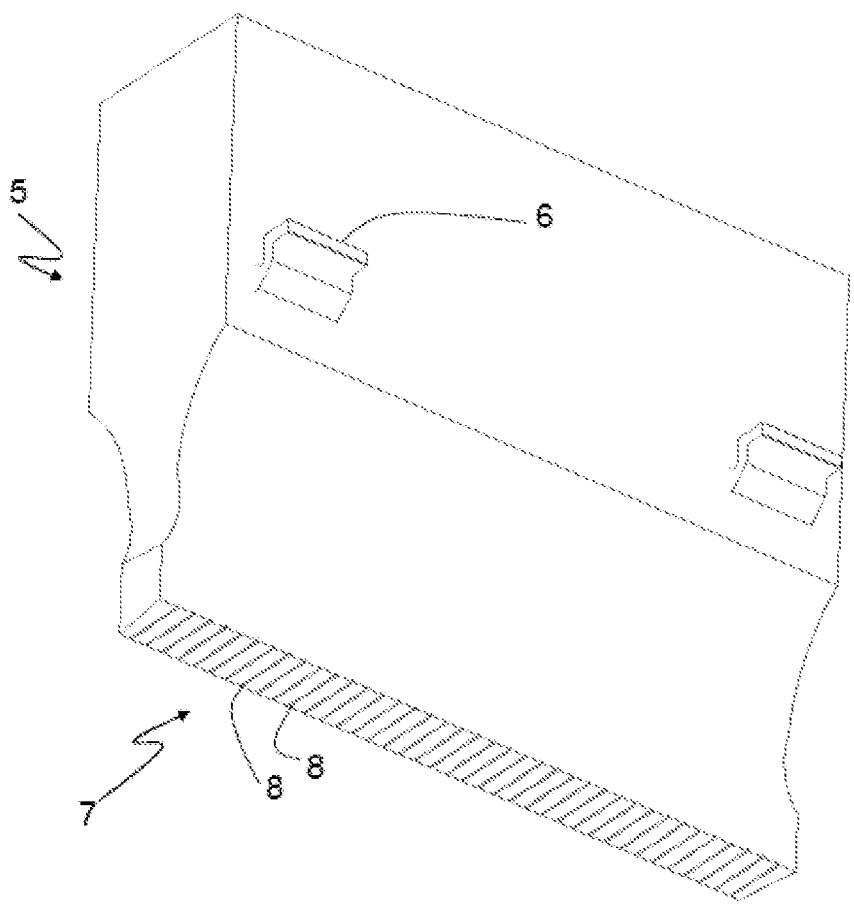
Figure 4:
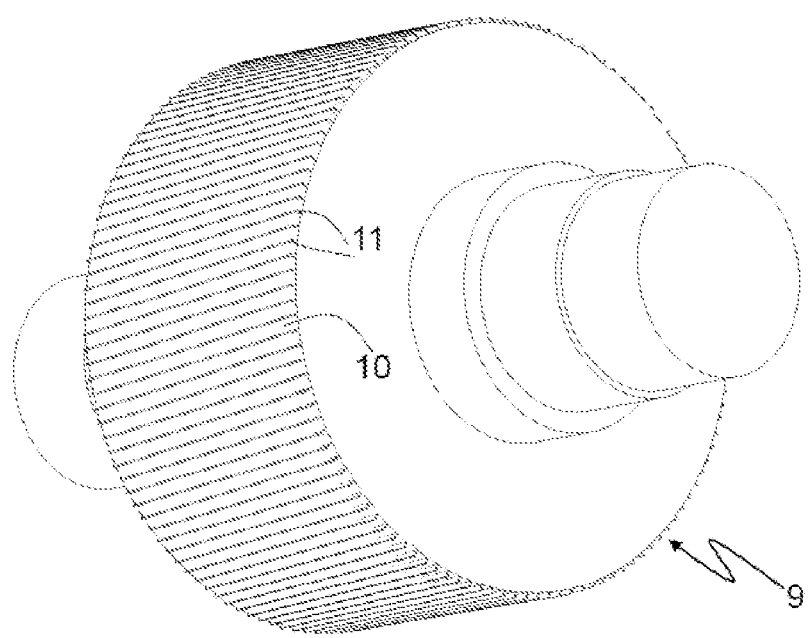
Figure 7A:
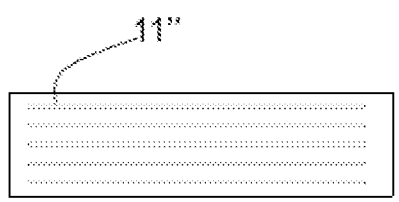
Figure 7B:
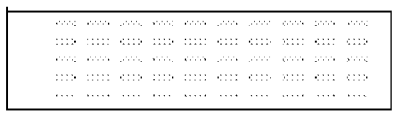
Figure 8A:
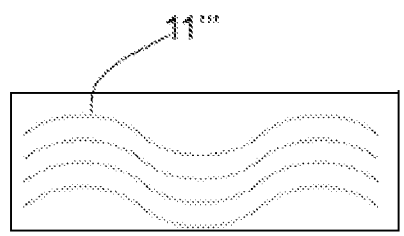
Figure 8B:
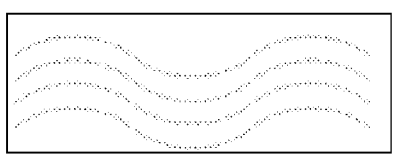
Figure 9:
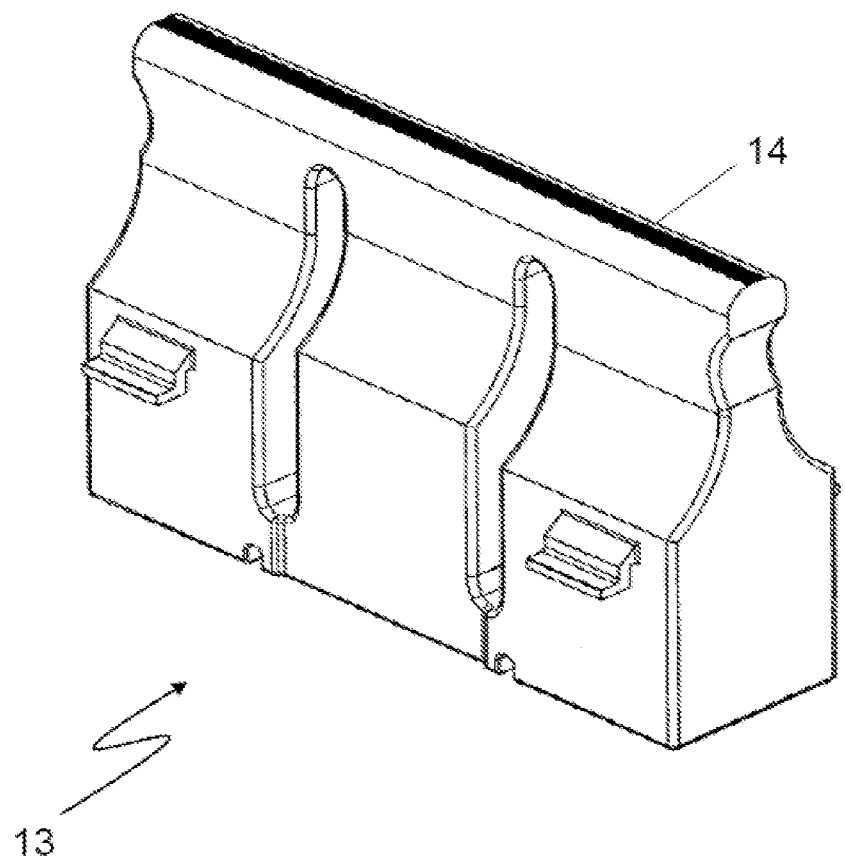
Figure 9A:
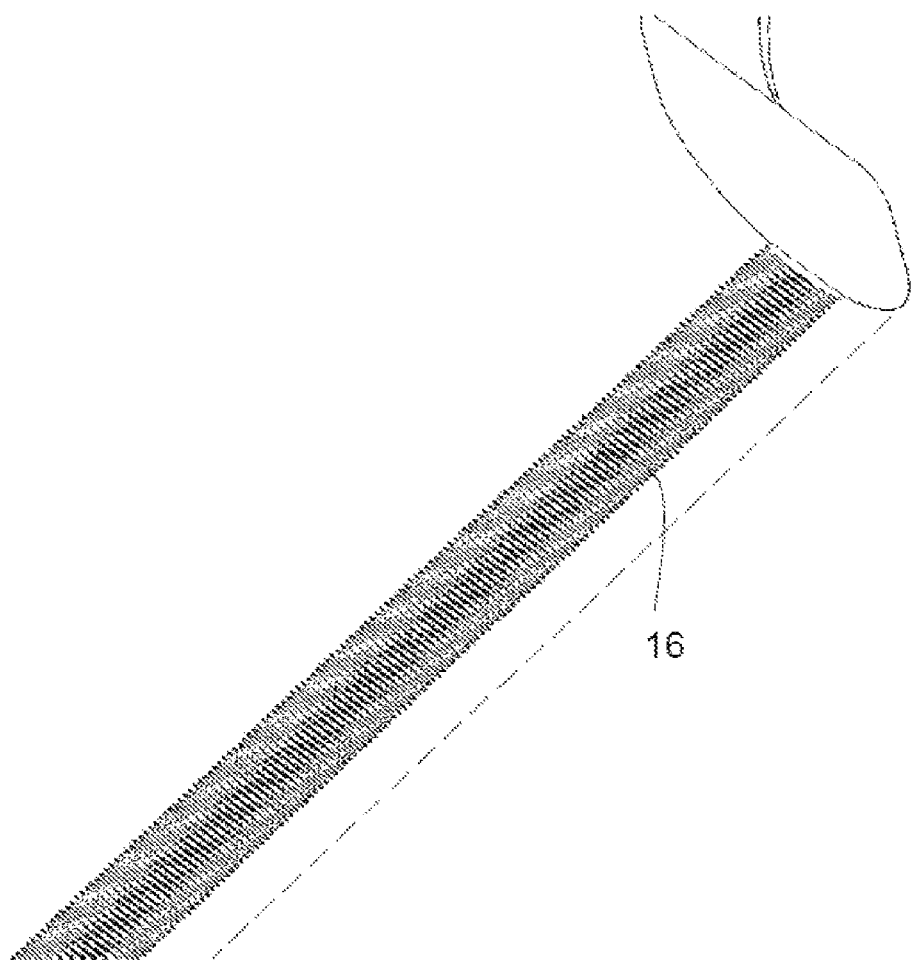
Figure 10:
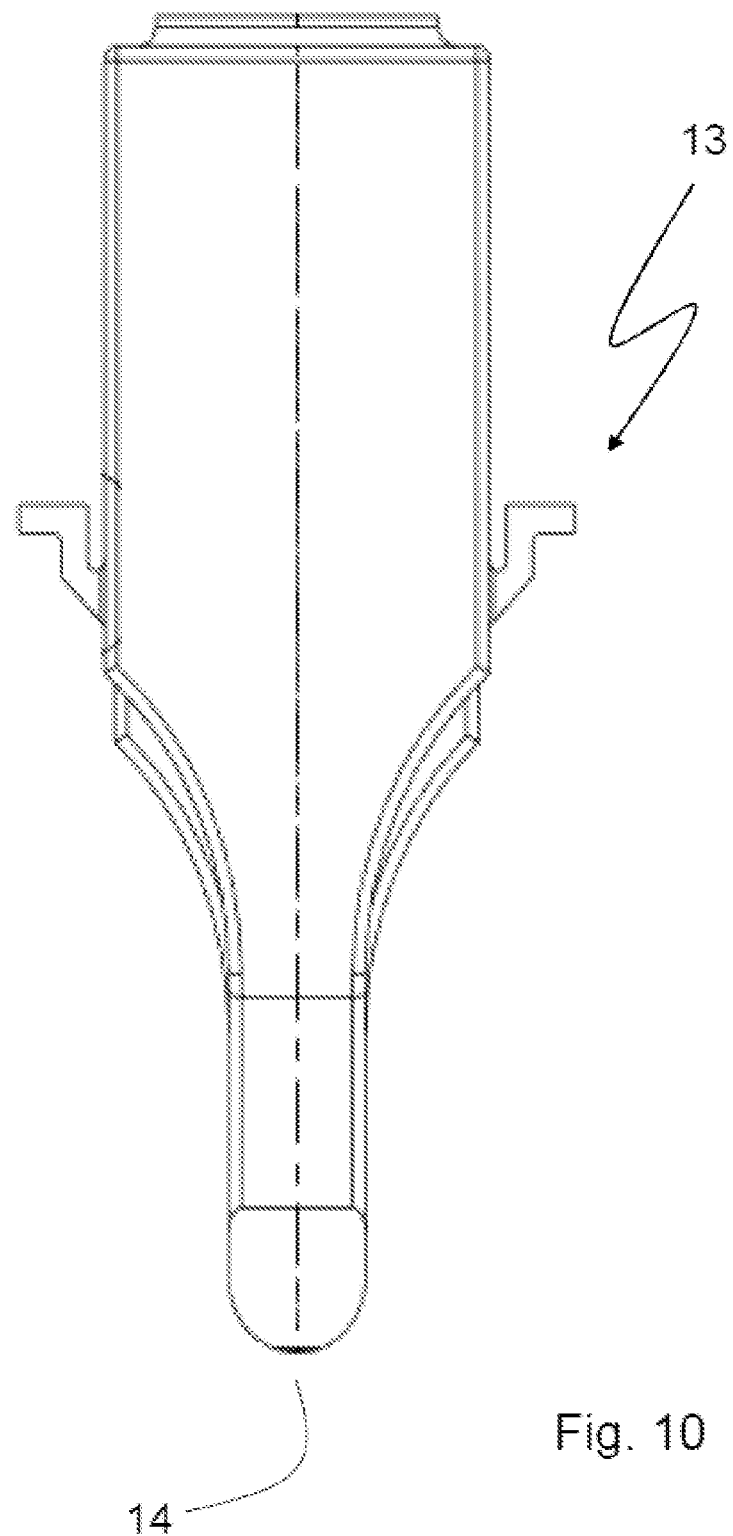
Figure 11:
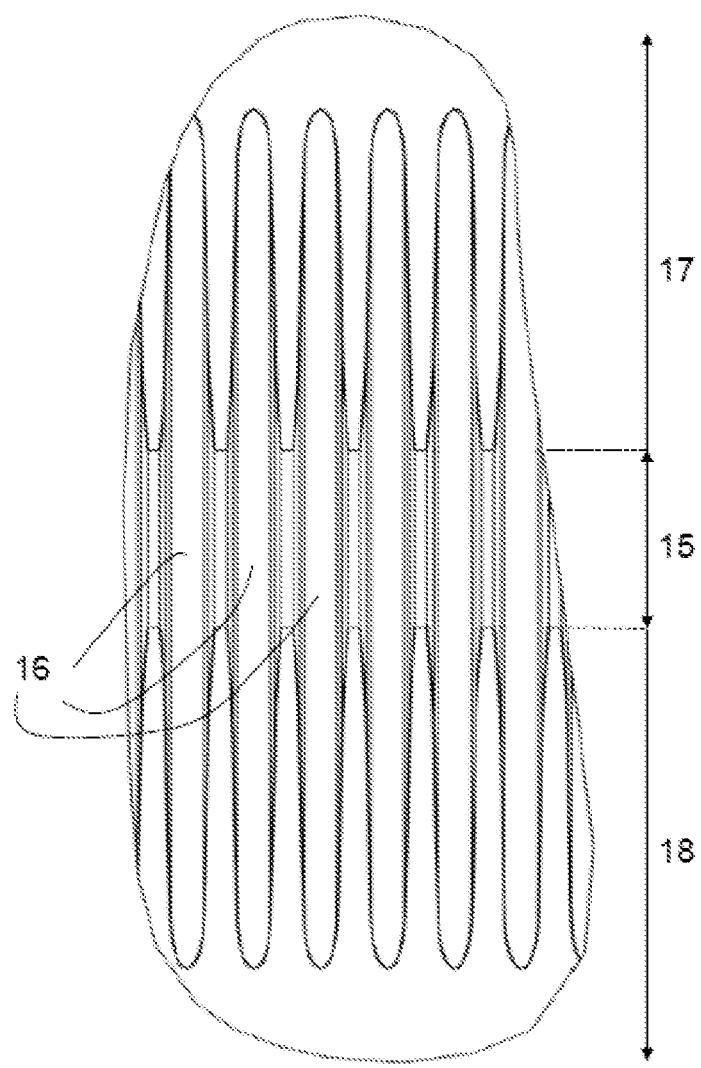
Figure 12:
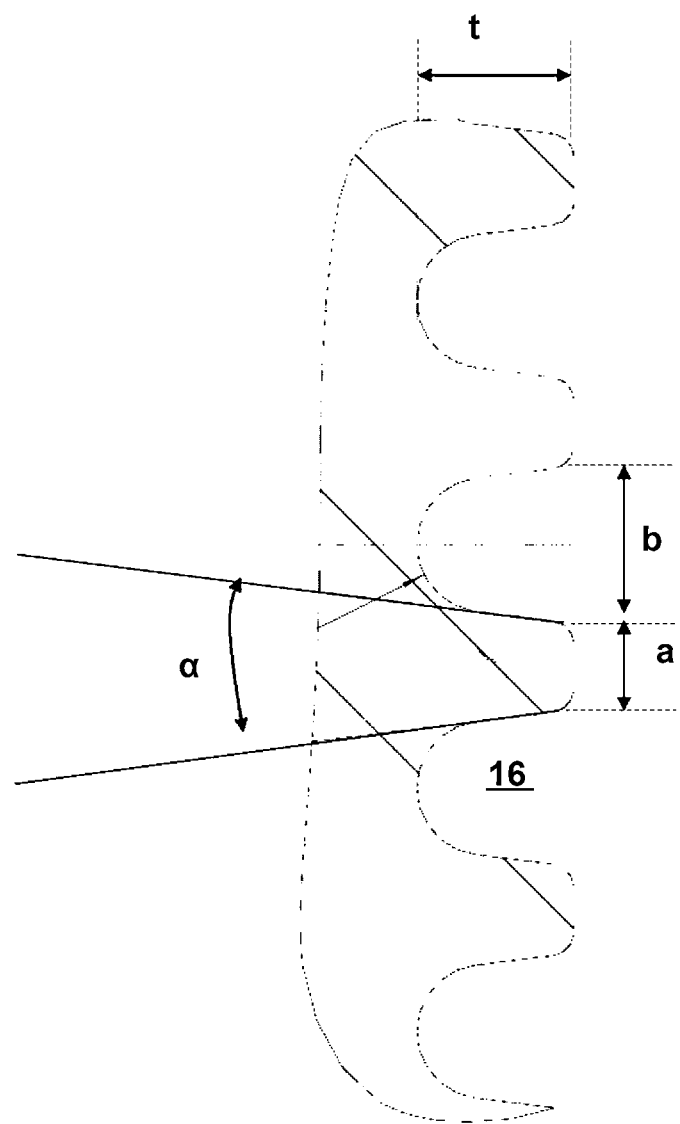

The figures show:

FIG. 1 a side view onto a first embodiment according to the invention of the apparatus, FIG. 2 a plan view onto the first sealing surface of the sonotrode of the embodiment of FIG. 1, FIG. 3 a perspective view of the sonotrode of FIG. 1, FIG. 4 is a perspective view onto the counter tool of the embodiment of FIG. 1, FIGS. 5a-5c partial sectional views of groove profiles of different embodiments, FIGS. 6a-8a, schematic views of the rib arrangement of different embodiments, FIGS. 6b-8b, schematic illustrations of the arrangement of the connecting surfaces when using the rib arrangements of FIGS. 6a-8a, FIG. 9 a perspective view onto a second embodiment of the sonotrode according to the invention, FIG. 9a an enlarged detail of FIG. 9, FIG. 10 a side view of the sonotrode of FIG. 9, FIG. 11 a partial view of a plan view onto the sealing surface of the sonotrode of FIG. 9, and FIG. 12 a partial sectional view through the sealing surface of the sonotrode of FIG. 9.

The apparatus 1 comprises a sonotrode 5 and a counter tool 9. The counter tool 9 is cylindrical and can be rotated about a cylinder axis such that the lateral surface of the cylindrical roller 9 can rotate in the direction u.

The counter tool comprises a sealing surface on its lateral surface. The sonotrode 5 likewise comprises a sealing surface, which is disposed such that the first sealing surface of the sonotrode 5 faces the second sealing surface of the counter tool 9. A gap remains between the two sealing surfaces, through which two material web portions 3, 4 and a thread or a group of threads 2 disposed between the two material web portions 3, 4 are moved in a feed direction v. Since the sonotrode 5 is subjected to an ultrasonic vibration, a welding process takes place in the gap between the sonotrode 5 and the counter tool 9 and the two material web portions 3, 4 are welded together.

The sonotrode 5 comprises brackets 6, the purpose of which is to hold the sonotrode in as vibration-decoupled a manner as possible.

FIG. 2 shows a plan view onto the first sealing surface 7 of the sonotrode 5. It can be seen that the sealing surface 7 is substantially flat and rectangular. However, this need not necessarily be the case. A series of grooves 8 have been introduced into the sealing surface 7. These grooves are disposed such that they are oriented in the direction of the feed direction v.

FIG. 3 shows a perspective view of the sonotrode 5 with the sealing surface 7. The V-shaped grooves 8 that have been introduced into the sealing surface 7 can be seen.

The grooves 8 are dimensioned such that the thread 2 can be received at least partially in the grooves 8. Since the welding process that takes place between the two sealing surfaces depends on corresponding contact between the sealing surface and the material web, there is no welding in the area of the grooves 8. As a result, the thread 2 or the threads 2 between the material web portions can be moved in longitudinal direction, i.e., in the direction in which the grooves 8 are oriented, relative to the material web portions in order to gather the material formed by the two material web portions.

Islands 7' are created between adjacent grooves 8, so that the first sealing surface 7 of the sonotrode 5 consists of a plurality of neighbouring islands 7'. Each island 7' produces a connecting surface between the two material web portions during the welding process, when it encounters a corresponding counter element on the sealing surface of the counter tool.

FIG. 4 shows a perspective partial view onto the counter tool 9. The counter tool 9 is roller-shaped; i.e., it has a cylindrical lateral surface. This lateral surface forms the second sealing surface 10. A plurality of bars 11, which extend transverse to the circumferential direction of the sealing surface 10 over the entire width of the sealing surface 10, are disposed on the second sealing surface 10. These bars 11 serve as a counter element for the islands 7'.

The bars 11 are disposed at a small angle to the cylinder axis. The force applied by the sonotrode 5 to the material web portions 3, 4 is thus more uniform.

Welding of the two material web portions 3, 4 occurs whenever an island 7' comes into position opposite to a rib 11 or a section of the rib 11. The remaining space between the island 7' and the rib 11 is so small that the two material web portions 3, 4 are pressed against one another and welded together as a result of the ultrasonic vibration of the sonotrode 5.

Figure 5A:
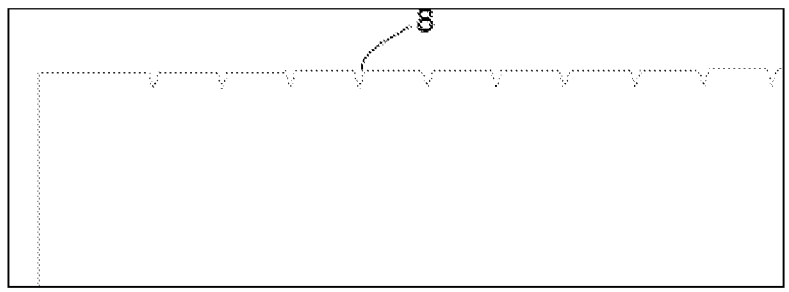
Figure 5B:
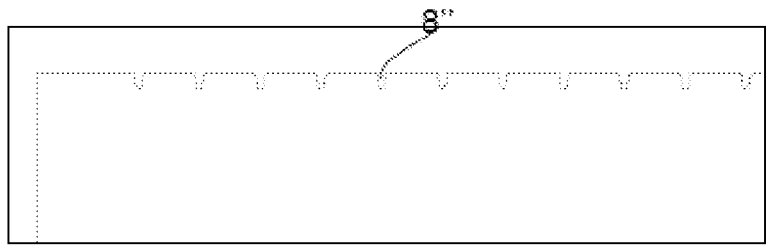
Figure 5C:
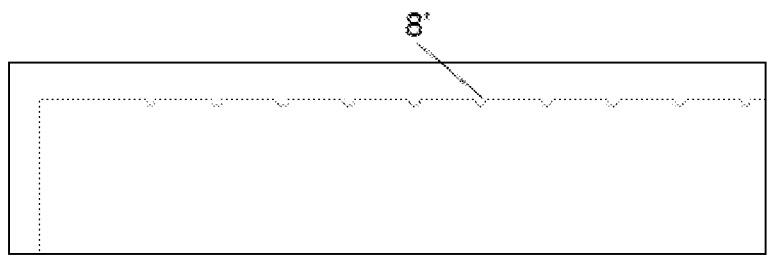

FIGS. 5a to 5c show three different embodiments of the sonotrode. Each figure shows only a partial cross-sectional view, in which the shape of the grooves 8, 8', 8" is depicted. In FIG. 5a, a V-shaped groove 8 can be seen. However, the groove 8, 8', 8" can also be U-shaped as shown in FIG. 5b. This U-shape has been labelled with the reference number 8'. This U-shape consists of a U-base and two U-flanks which are not disposed at right angles to the U-base, but are inclined outward at a flank angle between 0° and 30° to facilitate the reception of the thread 2.

Alternatively, as shown in FIG. 5c, the groove can also be configured as a semicircular or semi-elliptical groove 8".

Figure 6A:
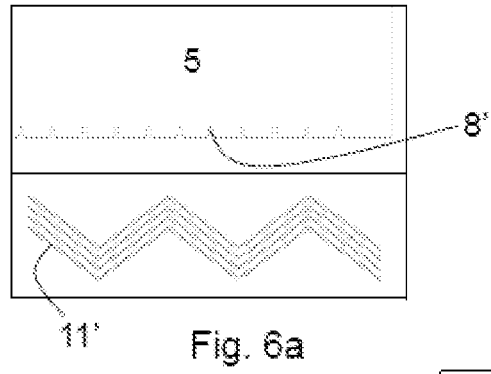
Figure 6B:
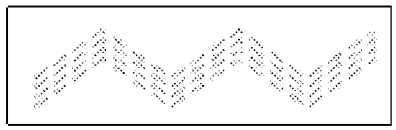

FIG. 6a schematically shows the sonotrode 5 in partial cross-section with the grooves 8'. The counter tool 9 is opposite to the sonotrode 5. The ribs disposed on the counter tool 9 are shown in FIG. 6a as zigzag-shaped ribs 11'. Whenever an island 7' of the sonotrode 5 situated between the grooves 8' is in position opposite to the rib 11', the two material web portions 3, 4, are welded together. The corresponding welding result is shown in FIG. 6b. The respective connecting surfaces 12 follow the contour of the rib 11', which, however, is interrupted whenever the sonotrode has a corresponding groove 8'.

The purpose of the interruptions is to receive the thread 2.

FIG. 7a shows a further alternative arrangement of the ribs on the counter tool 9. The ribs 11" here are parallel to the cylinder axis, so that the arrangement of the connecting surfaces 12 shown in FIG. 7b results.

Lastly, FIG. 8a shows a further configuration of the ribs 11''', which here are wave-shaped. This has the consequence, as shown in FIG. 8b, that the corresponding connecting surfaces 12 also follow a wave structure. Both the sonotrode 5 and the counter tool 9 can be produced in a simple manner.

FIGS. 9-12 show views of a second embodiment of the invention.

FIG. 9 shows a perspective view of a sonotrode 13. The sonotrode 13 has a wedge-shaped end which tapers to a point in the direction of a sealing surface 14. In contrast to the first embodiment shown in FIG. 3, the sealing surface 14 here comprises a lot more grooves 16 as can be seen in particular in the enlarged detail of FIG. 9a. The number of grooves is so large that not every groove receives a thread. This sonotrode can therefore also be used for the production of materials with different numbers of threads with different thread spacings.

FIG. 10 shows a side view of this sonotrode 13. The sealing surface 14 has an almost semicircular cross-section. In fact, however, as can be seen in the detail plan view of FIG. 11, the sealing surface 14 comprises a weld section 15 that is flat. This weld section 15 is adjoined by an inlet section 17 and an outlet section 18 which are convexly curved, specifically with a radius of curvature of 7.5 mm.

A plurality of grooves arranged parallel to one another are disposed in the sealing surface 14. The groove cross-section is shown in FIG. 12. The grooves themselves are U-shaped, whereby the flanks of adjacent grooves include a flank angle a of 14°. The spacing a between adjacent grooves is less than the width b of the grooves. The grooves extend over the weld section 15 and into the inlet section 17 and the outlet section 18. Due to the convex curvature of the inlet and the outlet section 17, 18, the groove depth in the inlet section 17 and the outlet section gradually decreases the further away the groove is from the weld section.

LIST OF REFERENCE SIGNS

1 Apparatus
2 Thread
3 Material web portion
4 Material web portion
5 Sonotrode
6 Brackets
7 First sealing surface
7' Island
8, 8', 8", Grooves
9 Counter tool
10 Second sealing surface
11, 11', 11", 11'" Bars/ribs
12 Connecting surfaces
13 Sonotrode
14 First sealing surface
15 Sealing section
16 Groove
17 Inlet section
18 Outlet section

The invention claimed is:

1. Apparatus for producing a gathered or gatherable material, wherein the material consists of at least two material web portions and at least one thread positioned between the material web portions,
wherein the two material web portions are connected to one another at at least two connecting surfaces, wherein the thread is disposed between the two connecting surfaces such that the thread is connected to the material web portions in such a way that there is a form-locking connection between the thread and the material web portions in a first and a second direction, wherein the two directions are oriented perpendicular to one another, wherein the apparatus comprises a sonotrode having a first sealing surface and a counter tool having a second sealing surface,
wherein the counter tool is cylindrical with a lateral surface and a first cylinder axis, the second sealing surface is disposed on the lateral surface and is rotatable about the cylinder axis, wherein the sonotrode and the counter tool are disposed with respect to one another in a processing position such that the material web portions and the thread can be guided through a gap formed by the first and the second sealing surface in a feed direction tangential to the lateral surface of the counter tool,
characterised in that the sonotrode comprises at least one groove which is oriented in the feed direction, and wherein the second sealing surface does not comprise a groove for partially receiving the at least one thread.

2. Apparatus according to claim 1, characterised in that the sonotrode comprises a plurality of grooves, which are oriented in the feed direction for at least partially receiving the at least one thread.

3. Apparatus according to claim 1, characterised in that the at least one groove has a depth between 0.02 and 1 mm.

4. Apparatus according to claim 1, characterised in that the at least one groove has a width between 0.02 and 1 mm wherein the spacing between adjacent grooves is preferably less than the width of the groove.

5. Apparatus according to claim 1, characterised in that the at least one groove has a semicircular cross-section, a U-shaped cross-section or a V-shaped cross-section.

6. Apparatus according to a claim 1, characterised in that the first sealing surface comprises a weld section that is substantially flat and an inlet section disposed adjacent to the weld section, wherein the inlet section is convexly curved.

7. Apparatus according to claim 6, characterised in that the groove is disposed in both the weld section and the inlet section.

8. Apparatus according to claim 1, characterised in that the counter tool comprises at least one rib having at least one portion which is not oriented in the circumferential direction.

9. Apparatus according to claim 8, characterised in that the at least one rib is shaped in a zig-zag or wavy manner or is linear, such that the rib is not oriented parallel to the first cylinder axis.

10. Apparatus according to claim 1, characterised in that the second sealing surface comprises at least one groove which is oriented in the feed direction, wherein, in the processing position, the at least one groove in the first sealing surface is disposed opposite to the at least one groove in the second sealing surface such that the at least one thread can be received simultaneously both in the at least one groove in the first sealing surface and in the at least one groove in the second sealing surface.

11. Apparatus according to claim 1, characterised in that the sonotrode at least partly comprises a coating and the at least one groove is disposed in the coating.

12. Method for producing a gathered or gatherable material, wherein the material consists of two material web portions and at least one thread, wherein the material web portions are connected to one another at at least two connecting surfaces and the thread is positioned between the material web portions and between the connecting surfaces such that there is a form-locking connection between the thread and the material web portions in a first and a second direction while a relative movement between the thread and the material web is possible in a third direction, wherein all three directions are oriented perpendicular to one another, characterised in that an apparatus according to claim 1 is used and the two material web portions are guided through the gap together with the at least one thread in the feed direction while the sonotrode is set in ultrasonic vibration, wherein the thread is guided through the at least one groove.

13. Method according to claim 12, characterised in that at least one elastic thread is used, wherein the at least one elastic thread is placed under tensile stress during processing.

14. Method according to claim 12, characterised in that a sonotrode comprising a number of grooves greater than the number of threads positioned between the material web portions and between the connecting surfaces is used.

15. Apparatus according to claim 1 wherein the at least one groove extends over the entire first sealing surface for at least partially receiving the at least one thread.

16. Apparatus according to claim 6, wherein the radius of curvature of the convexly curved inlet section is greater than 1 mm.

17. Apparatus according to claim 10 wherein the at least one groove completely surrounds the lateral surface of the second tool for partially receiving the at least one thread.

18. Apparatus according to claim 11 wherein the coating consists of hard metal.

19. Apparatus according to claim 11, wherein the coating consists of tungsten carbide.

20. Apparatus according to claim 8, wherein the at least one rib extends over the entire width of the second sealing surface.

\* \* \* \* \*